United States Patent
Lee et al.

(10) Patent No.: US 8,552,923 B2
(45) Date of Patent: Oct. 8, 2013

(54) PROJECTOR AND PROJECTION CONTROL METHOD OF THE PROJECTOR

(75) Inventors: Jin Wook Lee, Yongin-si (KR); Hun Lim, Yongin-si (KR); Gene Moo Lee, Seongnam-si (KR); Won Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 997 days.

(21) Appl. No.: 12/055,957

(22) Filed: Mar. 26, 2008

(65) Prior Publication Data

US 2009/0073393 A1 Mar. 19, 2009

(30) Foreign Application Priority Data

Sep. 18, 2007 (KR) .................. 10-2007-0094771

(51) Int. Cl.
*G03B 21/00* (2006.01)

(52) U.S. Cl.
USPC ............. 345/1.1; 345/1.2; 345/1.3; 345/32; 345/204

(58) Field of Classification Search
USPC ............ 345/32, 204, 1.1–3.4; 353/30, 94, 69, 353/70, 79; 348/745, 806
See application file for complete search history.

(56) References Cited

U.S. PATENT DOCUMENTS

| | | | |
|---|---|---|---|
| 2001/0040671 A1* | 11/2001 | Metcalf | 353/94 |
| 2005/0036117 A1* | 2/2005 | Kobayashi | 353/70 |
| 2006/0050016 A1* | 3/2006 | Tomisawa et al. | 345/32 |
| 2007/0046902 A1* | 3/2007 | Yajima | 353/70 |
| 2007/0176851 A1* | 8/2007 | Willey et al. | 345/32 |
| 2008/0191966 A1* | 8/2008 | Van Berkel | 345/32 |
| 2008/0309884 A1* | 12/2008 | O'Dor et al. | 353/7 |

FOREIGN PATENT DOCUMENTS

| | | |
|---|---|---|
| JP | 2005-159812 | 6/2005 |
| JP | 2005-286772 | 10/2005 |
| JP | 2006-284990 | 10/2006 |
| JP | 2006-295584 | 10/2006 |
| KR | 686647 | 2/2007 |

* cited by examiner

*Primary Examiner* — Alexander S Beck
*Assistant Examiner* — Jeffrey Steinberg
(74) *Attorney, Agent, or Firm* — NISP Law

(57) ABSTRACT

A projector control system includes a location measurement unit which measures location information of a projector; a projection information unit which generates projection information using the location information; a communication unit which transmits the projection information to the projector; and an image control unit which controls the projector to project an image according to the projection information.

16 Claims, 5 Drawing Sheets

PROJECTOR AND PROJECTION CONTROL METHOD OF THE PROJECTOR

CROSS-REFERENCE TO RELATED APPLICATION

This application claims the benefit under 35 U.S.C. §119 (a) of Korean Patent Application No. 10-2007-0094771, filed on Sep. 18, 2007, in the Korean Intellectual Property Office, the entire disclosure of which is incorporated herein by reference.

TECHNICAL FIELD

The following description relates generally to a projector and a projection control method of the projector, and more particularly to a projector control system and a projection control method for a multi-projector system.

BACKGROUND

Currently, a variety of convenient features are being developed for use with digital devices. For example, many digital devices have communication functions, and users may receive various services anytime and anywhere through network connections among such digital devices.

In addition, various image media technologies, such as, for example, user created content (UCC), have entered the mainstream. UCC encourages users to share various images, taken by digital cameras, video cameras, or mobile communication terminals. Although users currently may see UCC only on websites, customers may desire to take advantage of the mobility of wireless digital devices to display UCC in everyday places.

UCC described above may be displayed by use of projectors. Particularly, portable projectors, which enable users to show UCC at any time and place, are desirable. In such portable projectors, a plurality of projectors are network-connected, and various images may be projected to a plurality of screens using various methods. Accordingly, a device that enables a user to project images from a plurality of projectors to a desired location anytime and anywhere through a network connection is also desirable.

SUMMARY

The projector control system and projection control method sets an image projection location of a plurality of projectors in order to produce a complementary image.

In one general aspect, a projector and projection control method of the projector includes a first projector and a second projector that are network-connected, an image is divided, and each projector projects the image to a single screen, respectively, and thus a screen location may be automatically organized through an organic combination among a plurality of projectors.

In another general aspect, a projector control system includes: a location measurement unit which measures location information of at least one projector; a projection information unit which generates projection information using the location information; a communication unit which transmits the projection information to the at least one projector; and an image control unit which controls the at least one projector to project an image according to the projection information. Embodiments may include one or more of the above or following features. For example, the at least one projector may be a first projector and a second projector. The first projector may be operated as a master projector and the second projector may be operated as a slave projector.

In still another general aspect, a projection control method includes: measuring location information of one or more projector; generating projection information using the location information; transmitting the projection information to the one or more projector; and controlling the one or more projector to project an image according to the projection information. Embodiments may include one or more of the above features.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals refer to the same elements, features, and structures.

DETAILED DESCRIPTION OF EXEMPLARY EMBODIMENTS

The following detailed description is provided for an understanding the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
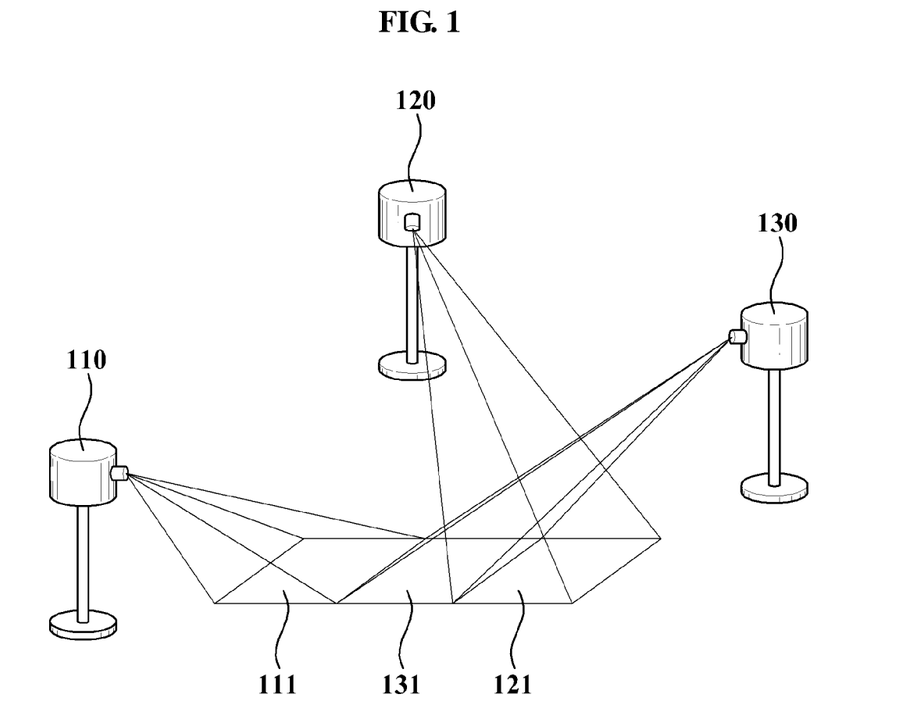
FIG. 1 is a diagram illustrating an example of an image projection system using a plurality of projectors.

FIG. 1 is a diagram illustrating an example of image projection from a plurality of projectors to a predetermined location.

For example, when the plurality of projectors includes a first projector 110, a second projector 120, and a third projector 130 as illustrated in FIG. 1, the first projector 110 may project the image to a first image location 111, the second projector 120 may project the image to a second image location 121, and the third projector 130 may project the image to a third image location 131.

As illustrated in FIG. 1, the first image location 111, the second image location 121, and the third image location 131 may be displayed adjacent to each other. In this case, the first projector 110, the second projector 120, and the third projector 130 may divide a single image into three sub-images, and project each of the three sub-images to the first image location 111, the second image location 121, and the third image location 131. Accordingly, the single image is displayed through the three projectors 110, 120, and 130, and thus an image size limit from a single projector may be overcome, and the image may be displayed on a bigger screen.

However, the image locations illustrated in FIG. 1 are simply an exemplary embodiment, and the first projector 110, the second projector 120, and the third projector 130 may project the same image or different images to different locations, respectively.

As illustrated in FIG. 1, the plurality of projectors may be network-connected and project a predetermined image to a predetermined location. Any one of the plurality of projectors may be operated as a master projector and the rest of the plurality of projectors may be operated as slave projectors. For example, referring to FIG. 1, the first projector 110 may be operated as the master projector, and the second projector 120 and the third projector 130 may be operated as the slave projectors.

The first projector 110, that is, the master projector, sets an image projection location of the second projector 120 and the third projector 130, that is, the slave projectors. Also, the first projector 110 controls the second projector 120 and the third projector 130 to project the image to a predetermined location, respectively. Additionally, the first projector 110 may control a type of image to be projected by the second projector 120 and the third projector 130.

A configuration of the master projector and a projection control method of the master projector are described in greater detail with reference to FIGS. 2 through 5.

Figure 2:
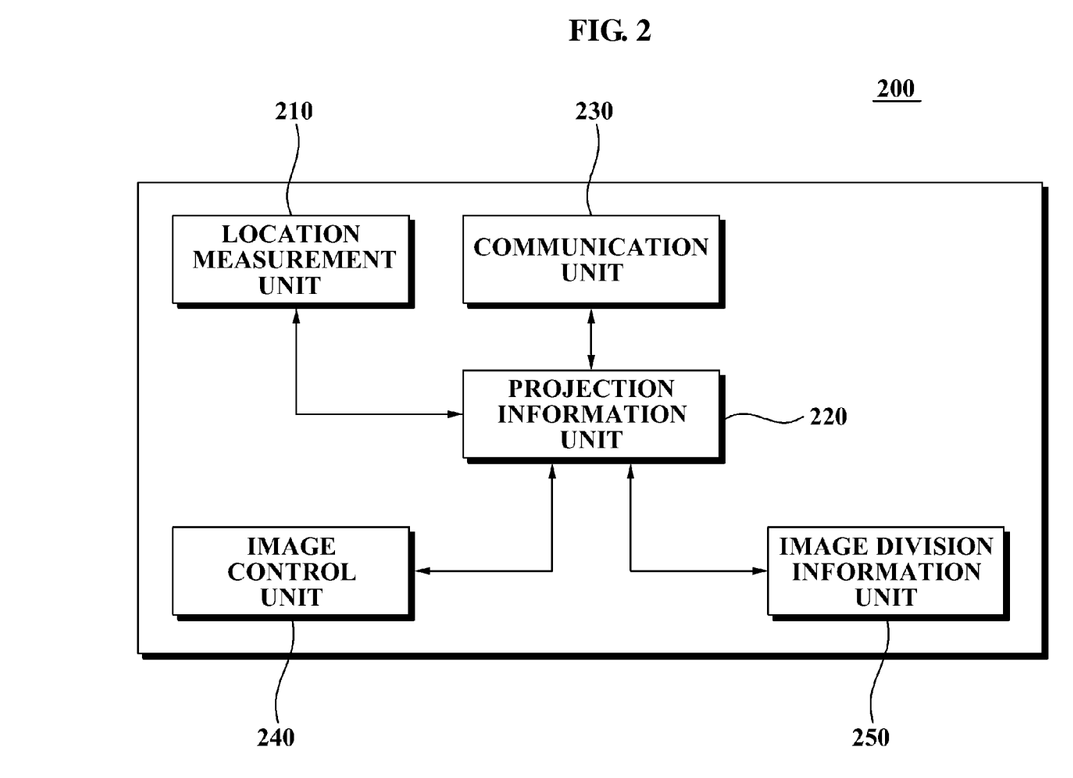
FIG. 2 is a block diagram illustrating an example of a projector control system.

FIG. 2 is a block diagram illustrating a projector control system 200.

The projector control system 200 includes a location measurement unit 210, a projection information unit 220, a communication unit 230, an image control unit 240, and an image division information unit 250. The projector control system may be located in a projector, such as, for example, the master projector described with respect to FIG. 1. As such, a configuration of the projector control system 200 indicates a configuration of a master projector of a plurality of projectors.

Referring again to FIG. 2, the location measurement unit 210 measures location information of at least one slave projector. For this, the location measurement unit 210 measures a distance and an angle between the projector 200 and each slave projector. The location measurement unit 210 may set a location of each slave projector on a coordinate plane, centered on the projector control system 200 or master projector, as coordinates using the distance and the angle, which is described in greater detail with reference to FIG. 3.

Figure 3:
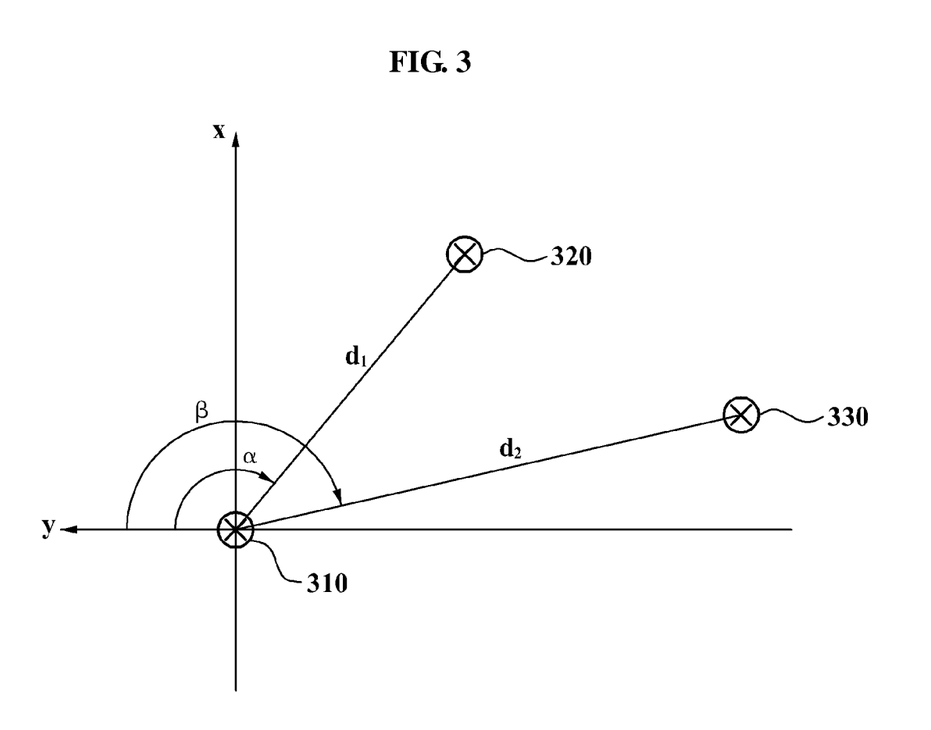
FIG. 3 is a diagram illustrating an example of a slave projector location information measurement rule of a master projector.

FIG. 3 is a diagram illustrating an example of a slave projector location information measurement rule of a master projector.

A master projector 310 may measure a distance and an angle from a first slave projector 320 and a second slave projector 330, respectively, and generate location information of the first slave projector 320 and the second slave projector 330. The location information may be measured by a location information unit 210 included in the master projector 310. However, for convenience of description, the location information may be measured by the master projector 310 with reference to FIG. 3.

The master projector 310 measures the distance and the angle from the first slave projector 320 and the second slave projector 330. As an example, the distance and the angle may be measured by a global positioning system (GPS) module. Specifically, the master projector 310 measures a GPS location of the master projector 310, a GPS location of the first slave projector 320, and a GPS location of the second slave projector 330 through the GPS module.

The master projector 310 substitutes the GPS location of the first slave projector 320 and the GPS location of the second slave projector 330 into a coordinate plane centered on the master projector 310, and measures coordinates of the first slave projector 320 and the second slave projector 330. In this case, the coordinate plane may be embodied as a variety of GPS coordinate planes widely used for a GPS measurement.

The master projector 310 measures a distance $d_1$ and angle $\alpha$ between the master projector 310 and the first slave projector 320, and a distance $d_2$ and angle $\beta$ between the master projector 310 and the second slave projector 330 through the coordinates of the first slave projector 320 and the second slave projector 330 on the coordinate plane.

The distance and angle may be measured by an ultrasonic module. The master projector 310 may measure the distance and the angle from each of the first slave projector 320 and the second slave projector 330 by rotating the ultrasonic module 360°.

For example, the ultrasonic module installed in the master projector 310 rotates 360° clockwise from a y-axis with a regular angular speed and may retrieve the location of the first slave projector 320 and the second slave projector 330 using ultrasonic waves. In this instance, the distance $d_1$ between the master projector 310 and the first slave projector 320 and the distance $d_2$ between the master projector 310 and the second slave projector 330 may be generally measured using an oscillation of the ultrasonic waves and a recurrence time difference.

The ultrasonic module oscillates the ultrasonic waves while rotating 360° clockwise from the y-axis with a regular angular speed. The angle $\alpha$ between the master projector 310 and the first slave projector 320 and the angle $\beta$ between the master projector 310 and the second slave projector 330 are measured using the regular angular speed and a time when the first slave projector 320 or the second slave projector 330 are sensed using the ultrasonic waves after starting from the y-axis.

Although it has been described that the distance and angle from the first slave projector 320 and the second slave projector 330 are measured using the GPS module and the ultrasonic module in this description, it will be apparent to those skilled in the related art that all kinds of distance and angle measurement methods may be used.

The master projector 310 measure the coordinates of the first slave projector 320 and the second slave projector 330, which are mapped on the coordinate plane, using the distance $d_1$, the distance $d_2$, the angle $\alpha$, and the angle $\beta$, which are measured by the ultrasonic module.

For example, when the coordinates of the master projector 310 are (ax, ay), the coordinates of the first slave projector 320 may be measured as $(ax+d_1*\sin(90-\alpha), ay-d_1*\cos(90-\alpha))$, and the coordinates of the second slave projector 330 may be measured as $(ax+d_2*\sin(90-\beta), ay-d_2*\cos(90-\beta))$.

Referring again to FIG. 2, as described with reference to FIG. 3, the location measurement unit 210 maps the coordinate of each of the first slave projector 320 and the second slave projector 330 into the coordinate plane, using the distance and the angle of the first slave projector 320 and the second slave projector 330. The location measurement unit 210 generates location information including the coordinates of the first slave projector 320 and the second slave projector 330. In this instance, the coordinate of each slave projector 320 and 330 are mapped into the coordinate plane.

The projection information unit 220 generates slave projection information corresponding to the first slave projector 320 and the second slave projector 330, using the location information of the first slave projector 320 and the second slave projector 330.

Prior to generating the slave projection information, the projection information unit 220 generates master projection information. The master projection information includes coordinates corresponding to a location where an image is projected by the projector 200, that is, the master projector, on the coordinate plane. The generating of the slave projection information and the master projection information are described in greater detail with reference to FIG. 4.

Figure 4:
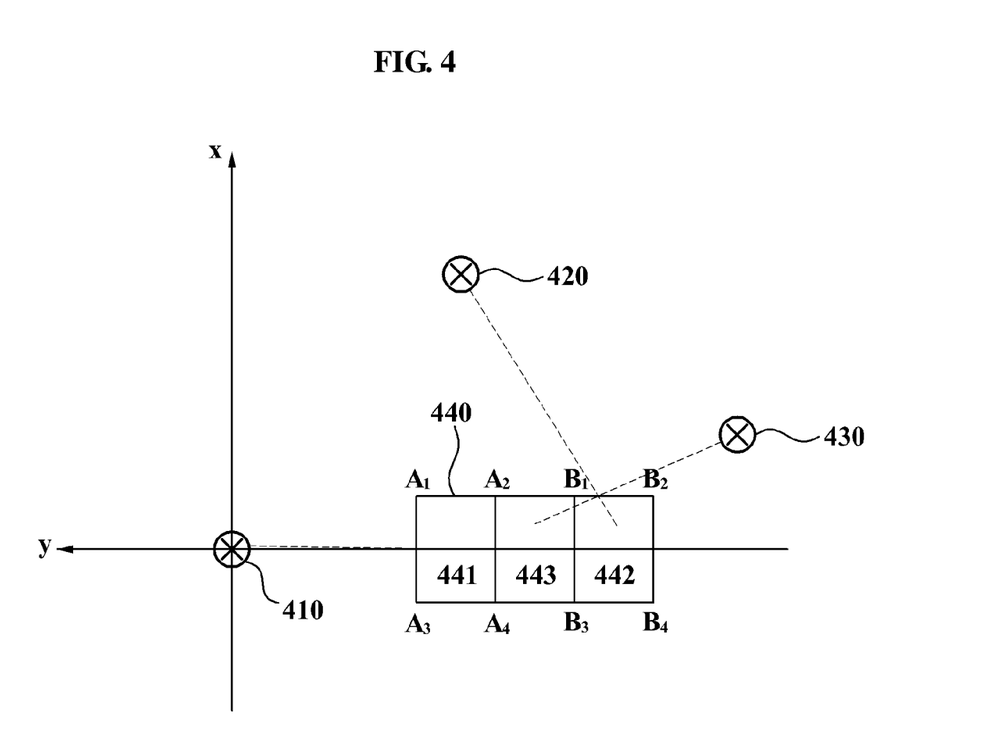
FIG. 4 is a diagram illustrating an example of image coordinates corresponding to projection information.

FIG. 4 is a diagram illustrating image coordinates corresponding to projection information on a coordinate plane.

A master projector 410 sets coordinates corresponding to a master image location 441 where an image is projected by the master projector 410 on the coordinate plane. The coordinates may be set as $(A_1, A_2, A_3, A_4)$. Also, the master projector 410 sets a first slave image location 442 where the image is projected by a first slave projector 420 as $(B_1, B_2, B_3, B_4)$, and sets a second slave image location 443 where the image is projected by a second slave projector 430 as $(C_1, C_2, C_3, C_4)$. While not illustrated in FIG. 4, $C_1$ and $A_2$ are a same point, $C_2$ and $B_1$ are a same point, $C_3$ and $A_4$ are a same point, and $C_4$ and $B_3$ are a same point. A size of each of the image locations 441, 442, and 443 may be embodied to be the same.

As illustrated in FIG. 4, the master projector 410 may set the master image location 441, the first slave image location 442, and the second slave image location 443 to be located adjacent to each other. However, the present embodiment is described as an example for convenience of description, and the image locations may be set depending on a user's convenience.

The master projector 410 measures the coordinates of the first slave image location 442 and the second slave image location 443 using the coordinate of the master image location 441, $(A_1, A_2, A_3, A_4)$.

For example, when the coordinates of the master image location 441, $(A_1, A_2, A_3, A_4)$, are set as ((ax+20, ay−25), (ax+20, ay−45), (ax−20, ay−25), (ax−20, ay−45)) in FIG. 4, the master projector 410 may measure the first slave image location 442 as ((ax+20, ay−65), (ax+20, ay−85), (ax−20, ay−65), (ax−20, ay−85)).

Also, the master projector 410 may measure the second slave image location 443 as ((ax+20, ay−45), (ax+20, ay−65), (ax−20, ay−45), (ax−20, ay−65)).

That is, the master projector 410 generates first slave projection information including the coordinates of the first slave image location 442, and second slave projection information including the coordinates of the second slave image location 443.

Also, as illustrated in FIG. 4, when each of the image locations 441, 442, and 443 is consecutively located adjacent to each other, the master projector 410, the first slave projector 420, and the second slave projector 430 project each sub-image to each of the image locations 441, 442, and 443, and thereby may display an image.

For this, the image division information unit 250 of FIG. 2 divides the image into at least one sub-image, and generates sub-image information corresponding to each of the sub-images. Referring to FIG. 4, the image division information unit 250 may divide the image into three sub-images so that a single image is displayed in an entire image location 440, and generate sub-image information with respect to each of the sub-images.

In this case, the projection information unit 220 may generate projection information including the sub-image information. For example, master projection information may include master sub-image information enabling the master projector 410 to project a sub-image corresponding to the master image location 441. The first slave projection information may include first slave sub-image information enabling the first slave projector 420 to project a sub-image corresponding to the first slave image location 442. The second slave projection information may include second slave sub-image information enabling the second slave projector 430 to project a sub-image corresponding to the second slave image location 443.

Referring again to FIG. 2, as described with reference to FIG. 4, where the projection information unit 220 generates the slave projection information, the communication unit 230 transmits the slave projection information to a corresponding slave projector. The communication unit 230 performs local communication, such as, for example, Bluetooth, Zigbee, Ultra wide band (UWB), and the like, and thereby may transmit the slave projection information to the first slave projector 420 and the second slave projector 430.

The image control unit 240 controls the first slave projector 420 and the second slave projector 430 to project the image according to the slave projection information.

For example, referring to FIG. 4, the image control unit 240 projects the image to the master image location 441. In this instance, the image control unit 240 controls the first slave projector 420 to project the image to the first slave image location 442, and the second slave projector 430 to project the image to the second slave image location 443.

The image projected by the master projector 410, the first slave projector 420, and the second slave projector 430 may be embodied as the sub-image divided from the one image as the exemplary embodiment of FIG. 4. Also, each projector may project the same image, and each projector may project different images. That is, the image locations and a type of image may be selected depending on a user's preference.

Figure 5:
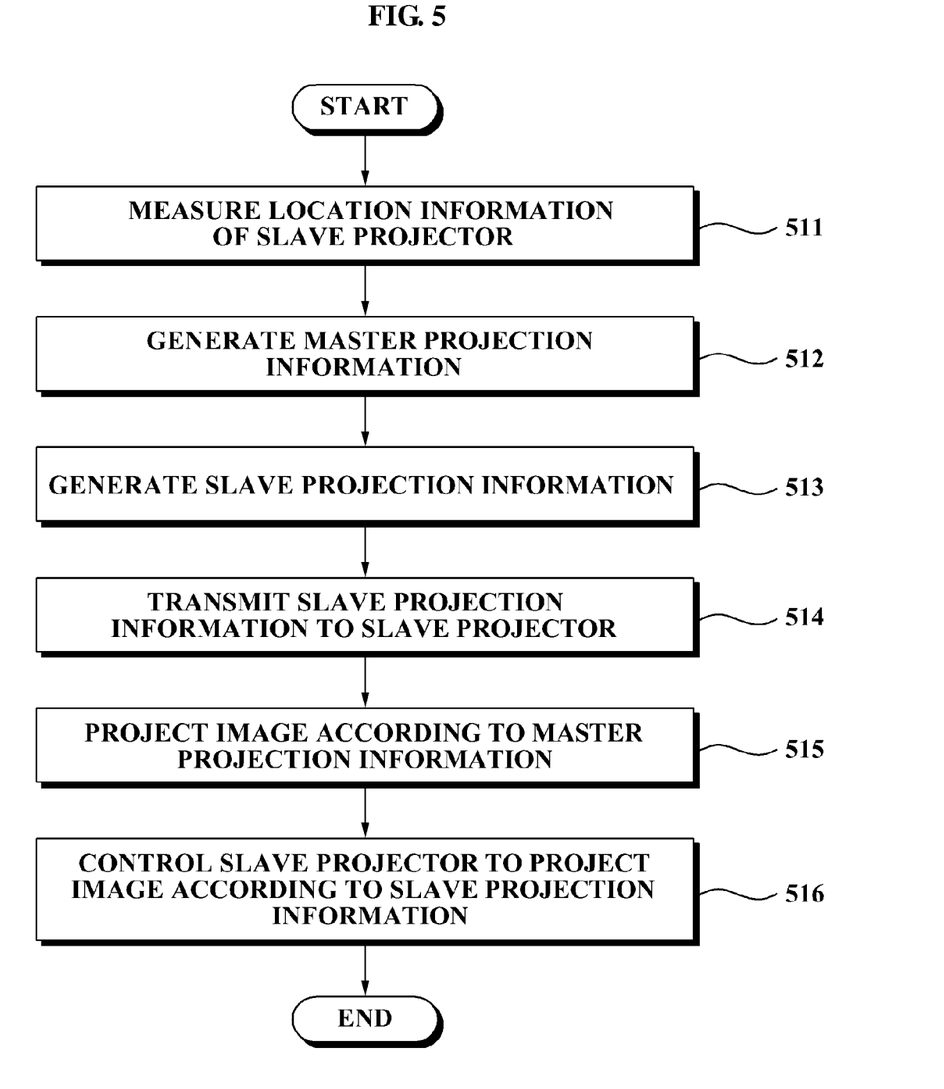
FIG. 5 is a flowchart illustrating an example of a projection control method of a projector system.

FIG. 5 is a flowchart illustrating a projection control method of a projector.

In operation 511, a projector, that is, for example, a master projector, measures location information of at least one projector, such as, for example, one or more slave projectors.

In operation 511, the projector control system maintains a coordinate plane which is centered on a location of the master projector, and measures coordinates that correspond to the location of the slave projector on a coordinate plane. The projector control system may measure a distance and an angle from the slave projector using a GPS module, and measure the coordinates of the slave projector on the coordinate plane using the distance and the angle. Also, the projector may measure the distance and the angle from the slave projector by rotating an ultrasonic module 360°, and measure the coordinates of the slave projector on the coordinate plane using the distance and the angle.

In operation 512, the projector control system generates master projection information. The master projection information includes coordinates corresponding to a location where the image is projected by the master projector on the coordinate plane. The master projection information may include sub-image information with respect to a sub-image to be projected by the projector, where the image is divided into sub-images.

In operation 513, the projector control system generates slave projection information. The slave projection information corresponds to the master projection information and includes coordinates corresponding to a location where the image is projected by the slave projector on the coordinate plane.

In operation 513, the projector control system may generate master projection information and the slave projection information corresponding to the master projection information. The master projection information includes first sub-image information and coordinates on the coordinate plane. The coordinates correspond to a location where an image according to the first sub-image information is projected by the master projector. The slave projection information includes second sub-image information and coordinates on the coordinate plane. The coordinates correspond to a location where an image according to the second sub-image information is projected by the slave projector. In this instance, the coordinates included in the master projection information and the coordinates included in the slave projection information may be set to be located adjacent to each other on the coordinate plane.

In operation 514, the projector control system may transmit the slave projection information to the slave projector.

In operation 515, the master projector may project the image to an image location according to the master projection information.

In operation 516, the projector control system controls the slave projector to project the image according to the slave projection information. Specifically, the projector control system may control the slave projector to project the image to a location corresponding to the coordinates included in the slave projection information. Also, the master projector may project the image according to the first sub-image information to the location corresponding to the coordinates included in the master projection information, and control the slave projector to project the image according to the second sub-image information to the location corresponding to the coordinates included in the slave projection information.

Although it has been simply described, it will be apparent to those skilled in the related art that the projection control method illustrated in FIG. 5 may be embodied according to projection operations of the projector described with reference to FIGS. 1 through 4.

The projection control system and method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A projector control system, comprising:
a location measurement unit configured to
measure a distance and an angle between a first projector and a second projector, and
measure location information based on the distance and the angle, the location information comprising coordinates of a location of the second projector that is mapped on a coordinate plane centered on coordinates of a location of the first projector;
a projection information unit configured to generate projection information based on the location information, the projection information comprising first projection information corresponding to the first projector, and second projection information corresponding to the second projector;
a communication unit configured to transmit the second projection information to the second projector;
an image division information unit configured to
divide an image into a first sub-image and a second sub-image, and
generate first sub-image information and second sub-image information that correspond to the first and second sub-images, respectively, the first projection information comprising the first sub-image information and coordinates of a location where the first sub-image is projected by the first projector on the coordinate plane, and the second projection information comprising the second sub-image information and coordinates of a location where the second sub-image is projected by the second projector on the coordinate plane; and an image control unit configured to
project the first sub-image based on the first sub-image information to the location corresponding to the coordinates included in the first projection information, and
control the second projector to project the second sub-image based on the second sub-image information to the location corresponding to the coordinates included in the second projection information.

2. The projector control system of claim 1, wherein:
the location measurement unit comprises a global positioning system (GPS) module; and
the location measurement unit is further configured to measure the distance and the angle between the first and second projectors using the GPS module.

3. The projector control system of claim 1, wherein:
the location measurement unit comprises an ultrasonic module; and
the location measurement unit is further configured to measure the distance and the angle between the first and second projectors by rotating the ultrasonic module 360°.

4. The projector control system of claim 1, wherein:
the first projector comprises a master projector;
the second projector comprises a slave projector;
the projection information comprises master projection information corresponding to the master projector, and slave projection information corresponding to the slave projector;
the master projection information comprises coordinates of a location where the image is projected by the master projector on the coordinate plane; and
the slave projection information comprises coordinates of a location where the image is projected by the slave projector on the coordinate plane.

5. The projector control system of claim 4, wherein the image control unit is further configured to:
project the image to the location corresponding to the coordinates included in the master projection information; and
control the slave projector to project the image to the location corresponding to the coordinates included in the slave projection information.

6. The projector control system of claim 1, wherein the projection information unit is further configured to:

set the coordinates included in the first projection information, and the coordinates included in the second projection information, to be located adjacent to each other on the coordinate plane.

7. A projection control method, comprising:
   measuring a distance and an angle between a master projector and a slave projector;
   measuring location information based on the distance and the angle, the location information comprising coordinates of a location of the slave projector that is mapped on a coordinate plane centered on coordinates of a location of the master projector;
   generating projection information based on the location information, the projection information comprising master projection information corresponding to the master projector, and slave projection information corresponding to the slave projector;
   dividing an image into a first sub-image and a second sub-image;
   generating first sub-image information and second sub-image information that correspond to the first and second sub-images, respectively, master projection information comprising the first sub-image information and coordinates of a location where the first sub-image is projected by the master projector on the coordinate plane, and the slave projection information comprising the second sub-image information and coordinates of a location where the second sub-image is projected by the slave projector on the coordinate plane;
   projecting the first sub-image based on the first sub-image information to the location corresponding to the coordinates included in the master projection information; and
   controlling the slave projector to project the second sub-image based on the second sub-image information to the location corresponding to the coordinates included in the slave projection information.

8. The projection control method of claim 7, further comprising:
   measuring the distance and the angle between the slave and master projectors using a GPS module.

9. The projection control method of claim 7, further comprising:
   measuring the distance and the angle between the slave and master projectors by rotating an ultrasonic module 360°.

10. The projection control method of claim 7, wherein
   the projection information comprises first projection information corresponding to the master projector, and second projection information corresponding to the slave projector;
   the first projection information comprises coordinates of a location where the image is projected by the master projector on the coordinate plane; and
   the second projection information comprises coordinates of a location where the image is projected by the slave projector on the coordinate plane.

11. The projection control method of claim 10, further comprising:
   projecting the image to the location corresponding to the coordinates included in the first projection information; and
   controlling the slave projector to project the image to the location corresponding to the coordinates included in the second projection information.

12. The projection control method of claim 7, further comprising:

setting the coordinates included in the master projection information, and the coordinates included in the slave projection information, to be located adjacent to each other on the coordinate plane.

13. A non-transitory computer-readable storage medium storing a program for implementing a projection control method of a projector, the program comprising instructions to cause a computer to:
   measure a distance and an angle between a master projector and slave projector;
   measure location information based on the distance and the angle, the location information comprising coordinates of a location of the slave projector that is mapped on a coordinate plane centered on coordinates of a location of the master projector;
   generate projection information based on the location information, the projection information comprising master projection information corresponding to the master projector, and slave projection information corresponding to the lave projector, the master projection information comprising first sub-image information, corresponding to a first sub-image, and coordinates of a location where the first sub-image is projected by the master projector on the coordinate plane, and the slave projection information comprising second sub-image information, corresponding to a second sub-image, and coordinates of a location where the second sub-image is projected by the slave projector on the coordinate plane;
   project the first sub-image based on the first sub-image information to the location corresponding to the coordinates included in the master projection information; and
   control the slave projector to project the second sub-image based on the second sub-image information to the location corresponding to the coordinates included in the slave projection information.

14. The projector control system of claim 2, wherein the location measurement unit is further configured to:
   measure a GPS location of the first projector, and a GPS location of the second projector, using the GPS module;
   substitute the GPS location of the second projector into the coordinate plane;
   measure the coordinates of the location of the second projector based on the substituted GPS location; and
   measure the distance and the angle between the first and the second projectors based on the coordinates of the location of the second projector.

15. The projector control system of claim 3, wherein the location measurement unit is further configured to:
   rotating the ultrasonic module 360° from an axis with an angular speed;
   oscillate ultrasonic waves during the rotating of the ultrasonic module;
   sensing the second projector based on the ultrasonic waves;
   measuring the distance between the first and the second projectors based on the ultrasonic waves and a recurrence time difference; and
   measuring the angle between the first and the second projectors based on the angular speed and a time of the sensing of the second projector.

16. The projector control system of claim 1, wherein:
   the coordinates of the location of the first projector are (ax, ay); and
   the coordinates of the location of the second projector are $(ax+d_1*\sin(90-\alpha), ay-d_1*\cos(90-\alpha))$, where $d_1$ is the distance, and $\alpha$ is the angle.

* * * * *